(12) United States Patent
Kukreja et al.

(10) Patent No.: US 9,128,764 B2
(45) Date of Patent: Sep. 8, 2015

(54) SYSTEM AND METHOD FOR PROVIDING FLEXIBILITY IN CONFIGURING HTTP LOAD BALANCING IN A TRAFFIC DIRECTOR ENVIRONMENT

(75) Inventors: Basant Kukreja, Santa Clara, CA (US); Parthasarathi Kundu, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 227 days.

(21) Appl. No.: 13/601,632

(22) Filed: Aug. 31, 2012

(65) Prior Publication Data

US 2013/0080656 A1  Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
*G06F 9/50*  (2006.01)
*G06F 9/44*  (2006.01)
(Continued)

(52) U.S. Cl.
CPC .............. *G06F 9/505* (2013.01); *G06F 9/4443* (2013.01); *G06F 9/45512* (2013.01); *G06F 11/2041* (2013.01); *H04L 41/08* (2013.01); *H04L 63/0853* (2013.01); *H04L 67/1008* (2013.01)

(58) Field of Classification Search
CPC .................................. H04L 29/08; G06F 9/44
USPC .......................................... 709/232, 230, 229
See application file for complete search history.

(56) References Cited

U.S. PATENT DOCUMENTS 6,560,717 B1  5/2003  Scott
6,691,244 B1  2/2004  Kampe et al.
(Continued)

FOREIGN PATENT DOCUMENTS

GB  2 360 369 A  9/2001
WO  02/07037  1/2002
(Continued)

OTHER PUBLICATIONS

Wikipedia, HTTP Compression, pp. 1-2, http://en.wikipedia.org/w/index.php?title=HTTP_compression&oldid=450858133, Sep. 16, 2011.

(Continued)

*Primary Examiner* — Ario Etienne
*Assistant Examiner* — Sahera Halim
(74) *Attorney, Agent, or Firm* — Tucker Ellis LLP

(57) ABSTRACT

Described herein are systems and methods for use with a load balancer or traffic director, and administration thereof, wherein the traffic director is provided as a software-based load balancer that can be used to deliver a fast, reliable, scalable, and secure platform for load-balancing Internet and other traffic to back-end origin servers, such as web servers, application servers, or other resource servers. In accordance with an embodiment, the system comprises a high-speed network infrastructure which provides communication protocols or sockets for use by the origin servers in receiving requests; one or more protocol terminator/emulators for use with the communication protocols or sockets; and an inbound socket configuration and an outbound socket configuration which together indicate which terminator/emulator the traffic director should use in communicating requests to particular ones of the origin servers.

15 Claims, 6 Drawing Sheets

(51) Int. Cl.
  *G06F 9/455* (2006.01)
  *G06F 11/20* (2006.01)
  *H04L 29/08* (2006.01)
  *H04L 12/24* (2006.01)
  *H04L 29/06* (2006.01)

(56) References Cited

U.S. PATENT DOCUMENTS

| | | |
|---|---|---|
| 6,880,156 B1 | 4/2005 | Landherr |
| 7,099,915 B1 | 8/2006 | Tenereillo |
| 7,158,926 B2 | 1/2007 | Kampe |
| 7,289,445 B2 | 10/2007 | Illikkal |
| 7,321,926 B1 | 1/2008 | Zhang |
| 7,370,083 B2 | 5/2008 | Husain et al. |
| 7,395,355 B2 | 7/2008 | Afergan |
| 7,616,625 B1 | 11/2009 | Un |
| 7,619,545 B2 | 11/2009 | Samuels |
| 7,664,948 B2 | 2/2010 | Moreau |
| 7,849,368 B2 | 12/2010 | Srivastava |
| 8,059,653 B1 | 11/2011 | Wang |
| 8,260,757 B1 | 9/2012 | Chatterjee |
| 8,693,981 B1 | 4/2014 | Anugu |
| 2001/0049732 A1 | 12/2001 | Raciborski |
| 2002/0087694 A1 | 7/2002 | Daoud |
| 2002/0122388 A1 | 9/2002 | Behbehani |
| 2002/0143953 A1 | 10/2002 | Aiken |
| 2002/0143965 A1 | 10/2002 | Aiken |
| 2002/0152307 A1* | 10/2002 | Doyle et al. .................. 709/225 |
| 2003/0023743 A1 | 1/2003 | Raphel |
| 2003/0051055 A1 | 3/2003 | Parrella et al. |
| 2003/0195940 A1 | 10/2003 | Basu |
| 2004/0024853 A1 | 2/2004 | Cates |
| 2004/0024861 A1 | 2/2004 | Coughlin |
| 2004/0031030 A1 | 2/2004 | Kidder |
| 2004/0049598 A1 | 3/2004 | Tucker |
| 2004/0107273 A1 | 6/2004 | Biran |
| 2004/0172470 A1 | 9/2004 | Shiina |
| 2005/0086337 A1 | 4/2005 | Quittek |
| 2005/0102400 A1 | 5/2005 | Nakahara |
| 2005/0188295 A1 | 8/2005 | Konkus et al. |
| 2005/0198247 A1 | 9/2005 | Perry |
| 2005/0262183 A1* | 11/2005 | Colrain et al. ................ 709/200 |
| 2006/0062177 A1 | 3/2006 | Asthana |
| 2006/0085680 A1 | 4/2006 | Matsuno |
| 2006/0190579 A1 | 8/2006 | Rachniowski et al. |
| 2006/0294207 A1 | 12/2006 | Barsness |
| 2007/0005801 A1 | 1/2007 | Kumar et al. |
| 2007/0130341 A1 | 6/2007 | Ma |
| 2007/0169049 A1 | 7/2007 | Gingell et al. |
| 2007/0174660 A1 | 7/2007 | Peddada |
| 2007/0226359 A1 | 9/2007 | Gunduc et al. |
| 2007/0260702 A1 | 11/2007 | Richardson |
| 2008/0046596 A1 | 2/2008 | Afergan |
| 2008/0133536 A1 | 6/2008 | Bjorner et al. |
| 2008/0228939 A1 | 9/2008 | Samuels |
| 2009/0006541 A1 | 1/2009 | Baba |
| 2009/0077233 A1 | 3/2009 | Kurebayashi |
| 2009/0204885 A1 | 8/2009 | Ellsworth et al. |
| 2009/0245122 A1 | 10/2009 | Maiocco |
| 2009/0259736 A1 | 10/2009 | Chang |
| 2009/0328054 A1 | 12/2009 | Paramasivam et al. |
| 2010/0030851 A1 | 2/2010 | Inden |
| 2010/0036956 A1 | 2/2010 | Nishikawa |
| 2010/0070561 A1 | 3/2010 | Dhoolia et al. |
| 2010/0220740 A1* | 9/2010 | Hufferd .................... 370/401 |
| 2010/0235484 A1 | 9/2010 | Bolan et al. |
| 2011/0106949 A1 | 5/2011 | Patel |
| 2011/0107136 A1 | 5/2011 | Jonnagadla et al. |
| 2011/0122893 A1 | 5/2011 | Kang |
| 2011/0145786 A1 | 6/2011 | Fayed et al. |
| 2011/0161523 A1 | 6/2011 | Erickson |
| 2011/0208808 A1 | 8/2011 | Corbett |
| 2011/0276695 A1 | 11/2011 | Maldaner |
| 2012/0096166 A1 | 4/2012 | Devarapalli |
| 2012/0271964 A1 | 10/2012 | Porter |
| 2013/0054806 A1 | 2/2013 | Francis |
| 2014/0089285 A1 | 3/2014 | Gibbs |

FOREIGN PATENT DOCUMENTS

| | | |
|---|---|---|
| WO | 03/105004 | 12/2003 |
| WO | 2004/008334 | 1/2004 |

OTHER PUBLICATIONS

Method and System for Displaying Graphical Objects in a Command Line Interface (CLI) Terminal, IP.COM Journal, IP.COM Inc., West Henrietta, NY, US, Feb. 18, 2010.

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

International Searching Authority, International Search Report and Written Opinion for PCT International Application No. PCT/US2012/057373, Feb. 14, 2013, 13 pages.

International Searching Authority, International Search Report and Written Opinion for PCT International Application No. PCT/US2012/057370, May 31, 2013, 17 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

Gouthaman, Oracle Traffic Director Administrator's Guide, 11g Release 1 (11.1.1.7.0), Aug. 2013, 312 pages, Oracle International Corporation.

Unknown Author, Chapter 4 Heath Checks Overview, Jun. 2009, pp. 4-1-4-78, Brocade Communications Systems, Inc.

* cited by examiner

SYSTEM AND METHOD FOR PROVIDING FLEXIBILITY IN CONFIGURING HTTP LOAD BALANCING IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to a load balancer or traffic director, for use in an application server, middleware machine or other computing environment, and is particularly related to a system and method for providing flexibility in configuring http load balancing in a traffic director environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the system comprises a traffic director having one or more traffic director instances, which is configured to receive and communicate requests, from clients, to origin servers having one or more pools of servers. In accordance with an embodiment, the system comprises a high-speed network infrastructure which provides communication protocols or sockets for use by the origin servers in receiving requests; one or more protocol terminator/emulators for use with the communication protocols or sockets; and an inbound socket configuration and an outbound socket configuration which together indicate which terminator/emulator the traffic director should use in communicating requests to particular ones of the origin servers.

DETAILED DESCRIPTION

Figure 1:
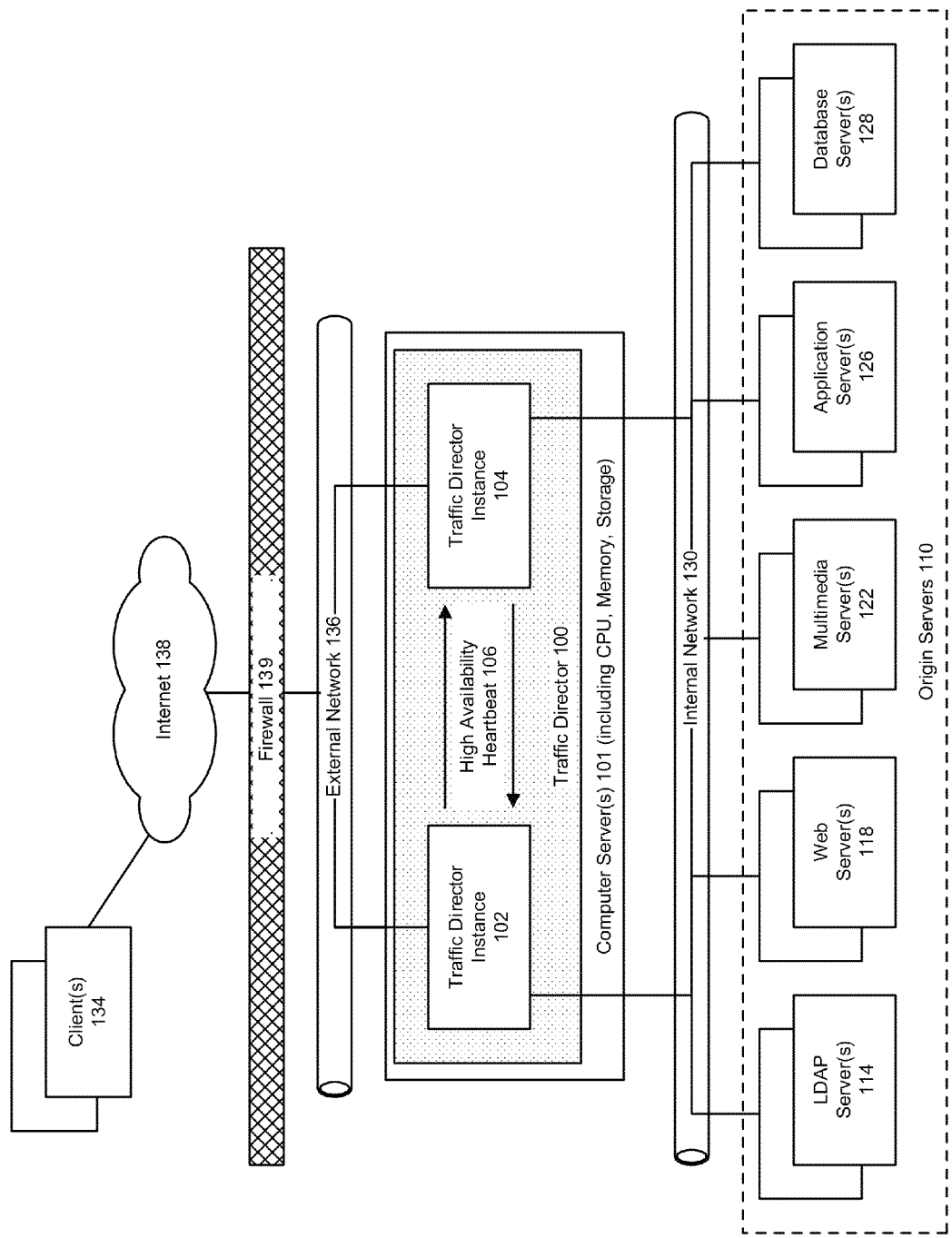
FIG. 1 illustrates a computing environment which includes a load balancer or traffic director, in accordance with an embodiment.

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name)

and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
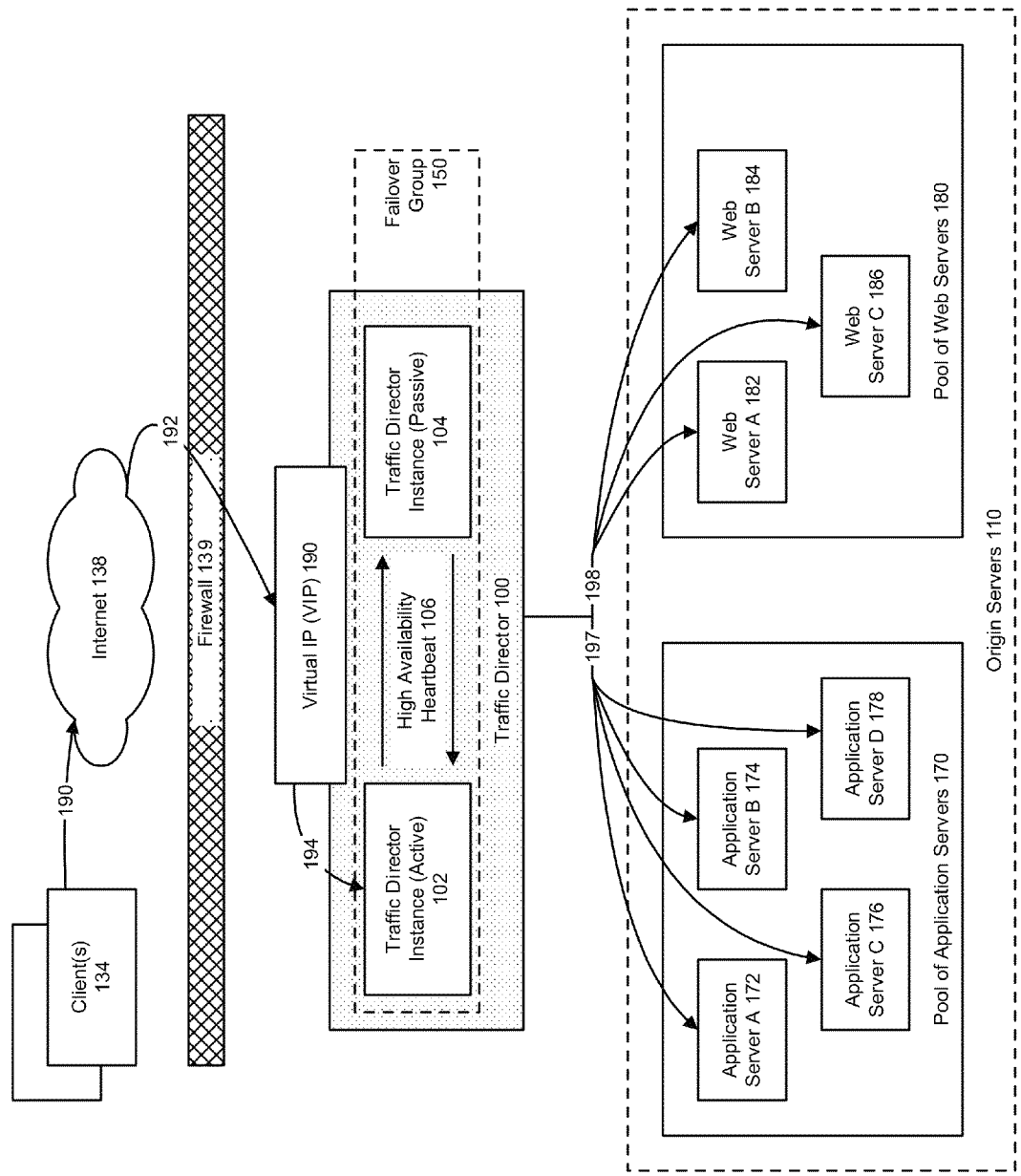
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C 186. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
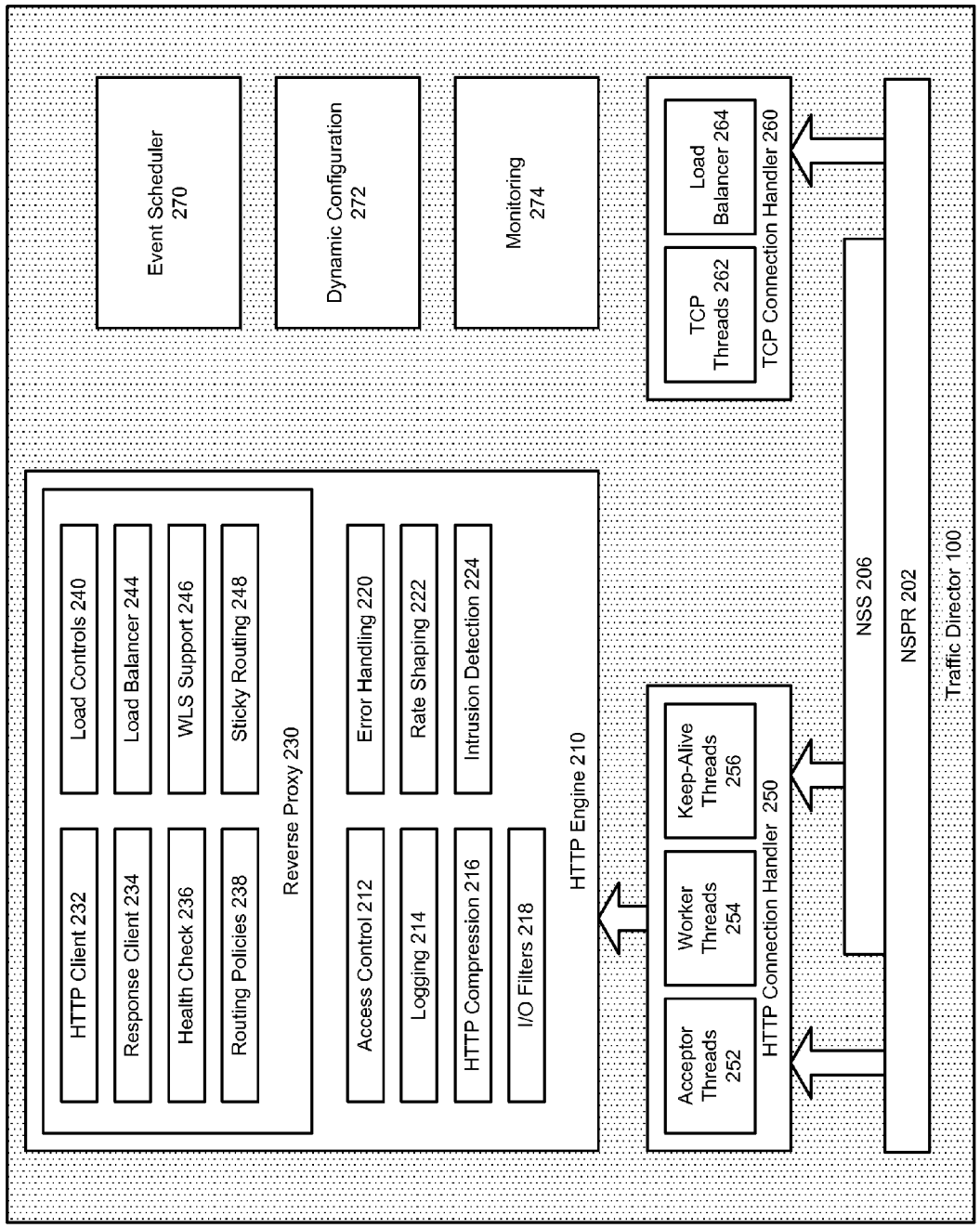
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more event scheduler 270, dynamic configuration 272, monitoring 274, or other components.

It will be evident that, in accordance with other embodiments, additional and/or different components can be used.

Figure 4:
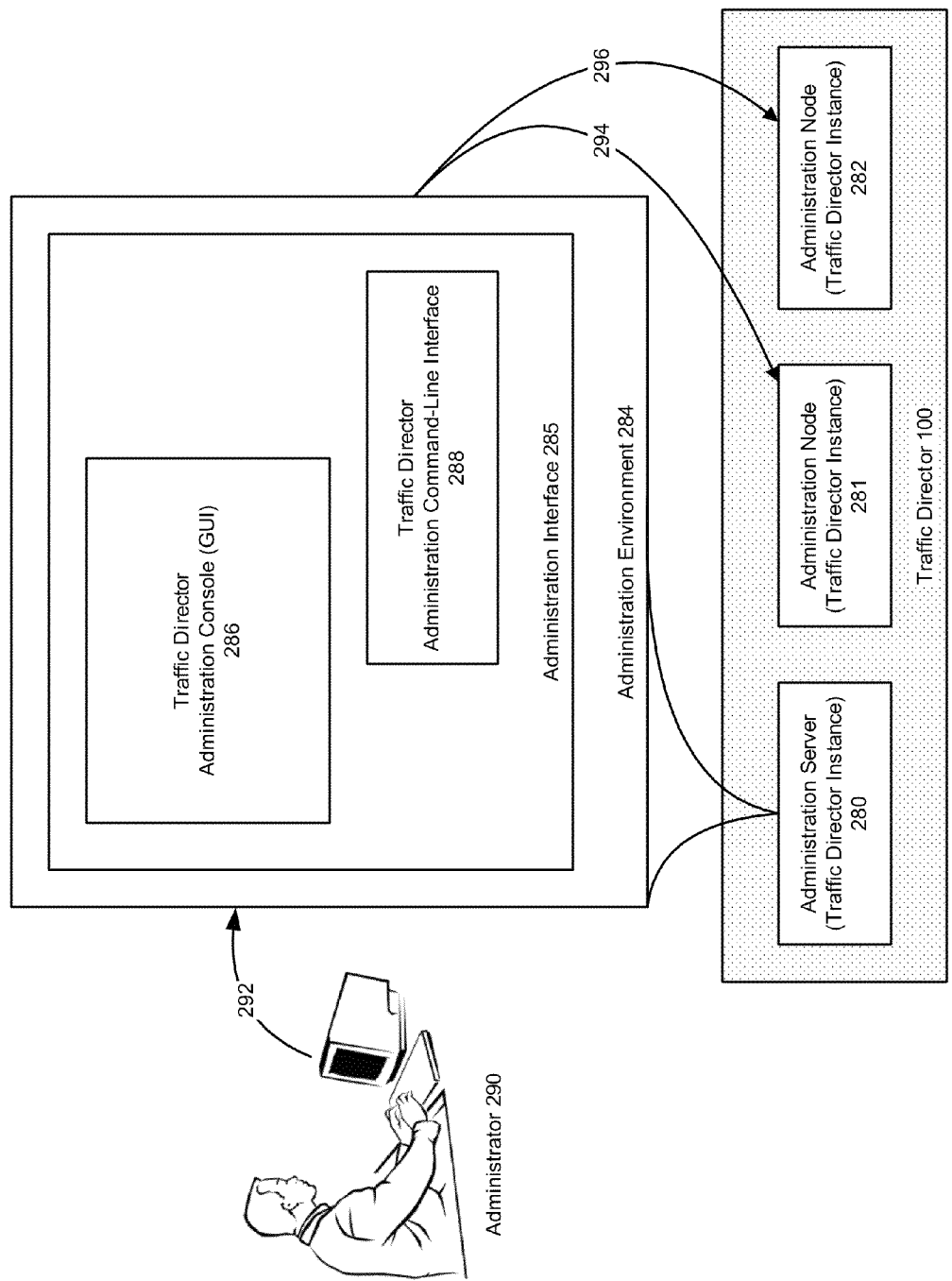
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Configuring Load Balancing with a
High-Performance Computing Environment

In accordance with an embodiment, when used as a local load balancer for a high-performance computing environment, such as an Exalogic middleware machine having a high-speed InfiniBand network infrastructure, the traffic director's load balancing can be designed to work seamlessly with the environment's network architecture.

InfiniBand is a switched-fabric communications link offering point-to-point bidirectional serial links, and is generally designed for the connection of processors with high-speed peripherals such as disks. Different protocols can be used to communicate over the InfiniBand fabric, examples of which include the Internet Protocol over InfiniBand (IPoIB), and the Sockets Direct Protocol (SDP).

The IPoIB protocol is used as an interface on top of the InfiniBand layer, and allows socket-based applications to utilize the host's TCP/IP protocol stack, which is then translated into native InfiniBand in a manner transparent to the application. The SDP protocol is an optimization of the sockets-based interface, and allows the system to bypass the TCP/IP stack and instead translate socket-based packets directly into the InfiniBand layer using remote direct memory access (RDMA) operations while maintaining existing TCP stream socket semantics. The SDP protocol has the advantage of bypassing the several software layers that are necessary to support IPoIB, which in turn results in SDP having better latency and throughput than IPoIB.

In accordance with an embodiment, the traffic director can terminate inbound, e.g., Ethernet traffic emulated over IB (EoIB), as inbound connections, and can communicate with origin servers over the InfiniBand network, using a protocol such as IPoIB or SDP, as outbound connections. The traffic director's integrated HTTP caching and compression capability makes it particularly suitable for the variable egress and ingress bandwidth requirements of high-performance computing environments such as Exalogic.

Figure 5:
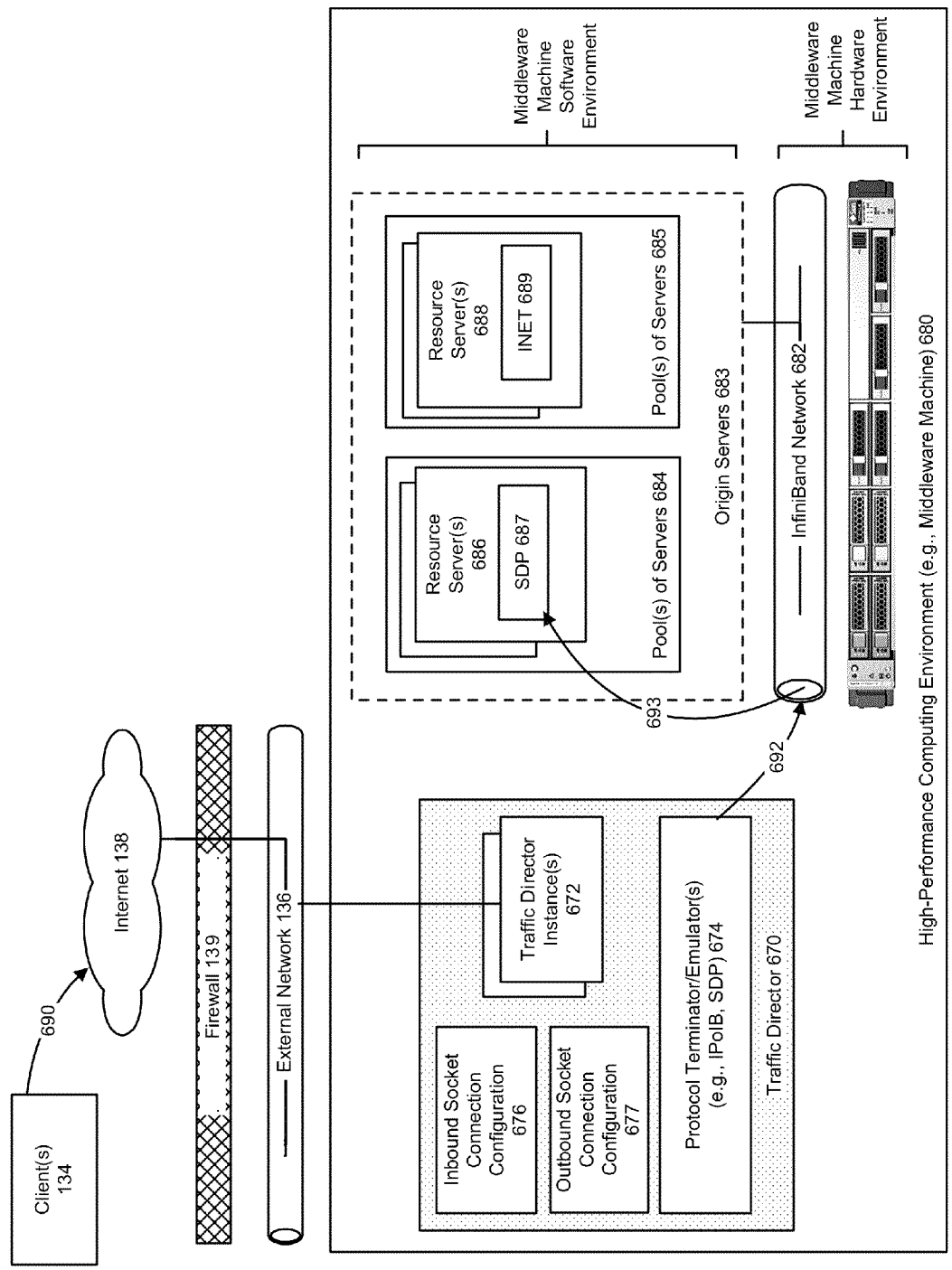
FIG. 5 illustrates the use of a traffic director, in accordance with an embodiment.

FIG. 5 illustrates the use of a traffic director, in accordance with an embodiment. As shown in FIG. 5, a traffic director 670, having one or more traffic director instances 672, can be used in combination with a high-performance computing environment, such as a middleware machine (e.g., Exalogic) 680, having a high-speed InfiniBand network infrastructure 682.

In accordance with an embodiment, the traffic director includes one or more protocol terminator/emulators 674 (for example, one or more IPoIB and/or SDP terminator/emulators), an inbound socket configuration 676, and an outbound socket configuration 677. The origin servers 683 can be provided as one or more pools of servers 684, 685, wherein each server pool includes one or more resource servers 686, 688. Depending on the particular needs of the organization, each pool of servers can be configured to use a communications protocol/socket, such as a traditional Inet socket, or alternatively a high-speed protocol such as IPoIB or SDP, by which those origin servers within that pool will receive requests from the traffic director. In the example illustrated in FIG. 5, the origin servers in server pool 684 are configured to use SDP 687, while the origin servers in server pool 685 are configured to use Inet 689. In accordance with other embodiments and examples, other types of protocol/socket can be used.

When a request 690 is received, directed to a particular origin server, the traffic director uses its configuration to determine an appropriate terminator/emulator, and communicate the request 692 to the high-speed InfiniBand network infrastructure, for communication to the origin server over its configured protocol/socket 693.

In accordance with an embodiment, to configure inbound connections, a http listener configuration can provided in a server.xml file, parameters and examples of which are provided in Table 1, and Listing 1 respectively.

TABLE 1

| Element | Occurrences | Description | Value |
| --- | --- | --- | --- |
| Family | 0 or 1 | Protocol family | default, inet, inet6, inet-sdp |

Listing 1

```
<server>
    <http-listener>
        <name>http-listener-a</name>
        <port>7777</port>
        <family>inet-sdp</family>
        <server-name>denali.oracle.com</server-name>
        <default-virtual-server-name>virtual-server-1</default-virtual-server-name>
    </http-listener>
    ...
    <virtual-server>
        <name>virtual-server-1</name>
        <host>denali.oracle.com</host>
        <http-listener-name>http-listener-1</ http-listener-name>
        <object-file>virtual-server-1-obj.conf</object-file>
    </virtual-server>
</server>
```

In accordance with an embodiment, to configure outbound connections, a http protocol configuration can provided in a server.xml file, parameters and examples of which are provided in Table 1, and Listing 1 respectively. Under a reverse-proxy element a list of server pools can be provided, each of which is a definition of a pool of origin servers. Each server pool in turn can contain multiple origin server elements. A family element indicates the socket family used to connect to the origin server. In accordance with an embodiment, possible values include, e.g., a default, Inet, Inet 6, or inet-SDP socket.

TABLE 2

| Element | Occurrences | Description | Value |
| --- | --- | --- | --- |
| Family | 0 or 1 | Protocol family | default, inet, inet6, inet-sdp |

Listing 2

```
<server>
<reverse-proxy>
<server-pool>
<name>myserverpool1</name>
<origin-server>
    <host>server1</host>
    <port>80</port>
    <protocol>http</protocol>
    <family>inet-sdp</family>
    <capacity>5</capacity>
</origin-server>
<origin-server>
    <host>server2</host>
    <port>80</port>
    <protocol>http</protocol>
    <family>inet-6</family>
    <capacity>10</capacity>
</origin-server>
</server-pool>
<server-pool>
<name>myserverpool2</name>
<algorithm>weighted-round-robin</algorithm>
<origin-server>
```

-continued

Listing 2

```
            <host>server3</host>
            <port>80</port>
            <protocol>http</protocol>
            <family>inet</family>
            <capacity>5</capacity>
        </origin-server>
    <origin-server>
            <host>server4</host>
            <port>80</port>
            <protocol>http</protocol>
            <family>inet</family>
            <capacity>10</capacity>
        </origin-server>
        </server-pool>
    </server>
```

Figure 6:
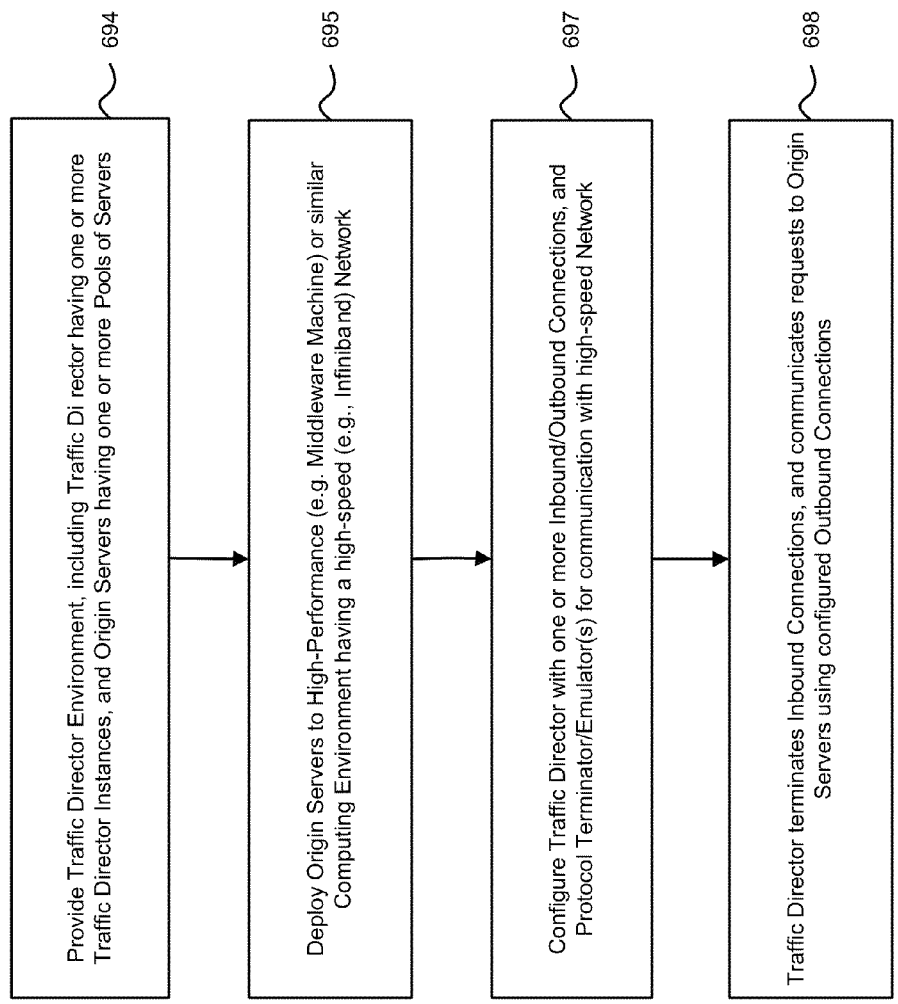
FIG. 6 is a flowchart of a method for using a traffic director, in accordance with an embodiment.

FIG. 6 is a flowchart of a method for using a traffic director, in accordance with an embodiment. As shown in FIG. 6, at step 694, a traffic director environment is provided, including a traffic director having one or more traffic director instances, and origin servers having one or more pools of servers. At step 695, one or more origin servers are deployed to a high-performance computing environment, such as a middleware machine (e.g., Exalogic), having a high-speed (e.g., Infini-Band) network. At step 697, the traffic director is configured with one or more inbound and outbound connections, and protocol terminator/emulators, for communication with the high-speed network. At step 698, the traffic director terminates inbound (e.g., EoIB) connections, and communicates requests from clients to the origin servers using the configured outbound connections, and terminators/emulators.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a computing environment which includes a traffic director component, comprising:
   a computer including memory and one or more microprocessors;
   a traffic director executing on the computer and having a plurality of traffic director instances,
      wherein the traffic director is configured to receive and communicate requests, from clients, to origin servers having one or more pools of servers, and wherein the plurality of traffic directory instances communicate with one another using a high-availability heartbeat;
   a high-speed network infrastructure, which provides communication protocols or sockets for use by the origin servers in receiving requests;
   one or more protocol emulators for use with the communication protocols or sockets; and
   an inbound socket configuration and an outbound socket configuration in the traffic director;
   wherein the traffic director, when receiving a request directed to a particular origin server, operates to determine a server pool from the one or more pools of servers associated with
the particular origin server to which to communicate the request,
   determine a protocol emulator for use with the server pool based on the inbound and outbound socket configurations, and
use the protocol emulator to communicate the request to a server from the server pool selected based on a load-distribution technique specified for the server pool.

2. The system of claim 1, wherein the system is included within a high-performance computing environment that includes an InfiniBand network infrastructure.

3. The system of claim 1, wherein each server pool includes one or more resource servers, and is configured to use a particular communications protocol or socket.

4. The system of claim 1, wherein the communication protocols or sockets includes the Internet Protocol InfiniBand (IPoIB).

5. The system of claim 1, wherein the communication protocols or sockets includes the Sockets Direct Protocol (SDP).

6. A method for use in a computing environment which includes a traffic director component, comprising the steps:
   providing a traffic director having one or more traffic director instances, wherein the traffic director is configured to receive and communicate requests, from clients, to origin servers having one or more pools of servers, and wherein the plurality of traffic directory instances communicate with one another using a high-availability heartbeat;
   providing a high-speed network infrastructure, which provides communication protocols or sockets for use by the origin servers in receiving requests;
   providing one or more protocol emulators for use with the communication protocols or sockets; and
   providing an inbound socket configuration and an outbound socket configuration in the traffic director;
   wherein the traffic director, when receiving a request directed to a particular origin server, operates to determine a server pool from the one or more pools of servers associated with the particular origin server to which to communicate the request, determine a protocol emulator for use with the server pool based on the inbound and outbound socket configurations, and use the protocol emulator to communicate the request to a server from the server pool selected based on a load-distribution technique specified for the server pool.

7. The method of claim 6, wherein the traffic director is included within a high-performance computing environment that includes an InfiniBand network infrastructure.

8. The method of claim 6, wherein each server pool includes one or more resource servers, and is configured to use a particular communications protocol or socket.

9. The method of claim 6, wherein the communication protocols or sockets includes the Internet Protocol InfiniBand (IPoIB).

10. The method of claim 6, wherein the communication protocols or sockets includes the Sockets Direct Protocol (SDP).

11. A non-transitory computer readable storage medium, including instructions stored thereon which when read and executed by one or more computers cause the one or more computers to perform the steps comprising:

providing a traffic director having one or more traffic director instances, wherein the traffic director is configured to receive and communicate requests, from clients, to origin servers having one or more pools of servers, and wherein the plurality of traffic directory instances communicate with one another using a high-availability heartbeat;

providing a high-speed network infrastructure, which provides communication protocols or sockets for use by the origin servers in receiving requests;

providing one or more protocol emulators for use with the communication protocols or sockets; and providing an inbound socket configuration and an outbound socket configuration in the traffic director;

wherein the traffic director, when receiving a request directed to a particular origin server, operates to determine a server pool from the one or more pools of servers associated with the particular origin server to which to communicate the request, determine a protocol emulator for use with the server pool based on the inbound and outbound socket configurations, and use the protocol emulator to communicate the request to the a server from the server pool selected based on a load-distribution technique specified for the server pool.

12. The non-transitory computer readable storage medium of claim 11, wherein the traffic director is included within a high-performance computing environment that includes an InfiniBand network infrastructure.

13. The non-transitory computer readable storage medium of claim 11, wherein each server pool includes one or more resource servers, and is configured to use a particular communications protocol or socket.

14. The non-transitory computer readable storage medium of claim 11, wherein the communication protocols or sockets includes the Internet Protocol InfiniBand (IPoIB).

15. The non-transitory computer readable storage medium of claim 11, wherein the communication protocols or sockets includes the Sockets Direct Protocol (SDP).

* * * * *